United States Patent [19]

Hill et al.

[11] Patent Number: 5,028,152
[45] Date of Patent: Jul. 2, 1991

[54] MACHINE WITH THERMALLY COMPENSATED BEARINGS

[75] Inventors: Harold E. Hill, Uhrichsville; Ronald P. Dickerhoff, Louisville; Gary E. Kreider, Massillon, all of Ohio

[73] Assignee: The Timken Company, Canton, Ohio

[21] Appl. No.: 496,854

[22] Filed: Mar. 21, 1990

[51] Int. Cl.⁵ .................................... F16C 33/58
[52] U.S. Cl. ........................ 384/557; 384/571; 384/582
[58] Field of Search ............... 384/557, 493, 905, 571, 384/565, 569, 582

[56] References Cited

U.S. PATENT DOCUMENTS

| 1,746,978 | 2/1930 | Winkler. | |
|---|---|---|---|
| 1,867,582 | 7/1932 | McCray. | |
| 2,141,145 | 12/1938 | Wooler et al. | 384/905 |
| 2,324,676 | 7/1943 | Butterfield. | |
| 2,700,581 | 1/1955 | Migny. | |
| 2,711,356 | 6/1955 | Ensinger. | |
| 2,727,796 | 12/1955 | Sardon. | |
| 2,803,507 | 8/1957 | Mempel et al. | |
| 2,836,473 | 5/1958 | Tydeman. | |
| 2,859,033 | 11/1958 | Rose. | |
| 3,106,432 | 10/1963 | Opferkuch. | |
| 3,202,466 | 8/1965 | Kaptur. | |
| 3,317,258 | 5/1967 | Hermann. | |
| 3,510,184 | 5/1970 | Graber et al. | |
| 3,561,829 | 2/1971 | Heldt. | |
| 3,640,591 | 2/1972 | Eklund. | |
| 3,692,372 | 9/1972 | Pineo. | |
| 4,033,644 | 7/1977 | Reneerkens. | |
| 4,283,096 | 8/1981 | Picard et al. | |
| 4,626,111 | 12/1986 | Swasey et al. | |
| 4,895,462 | 1/1990 | Takata | 384/493 |

FOREIGN PATENT DOCUMENTS 2658791  6/1978  Fed. Rep. of Germany.

OTHER PUBLICATIONS

"Timken... Bearings... Applications", Timken Co., p. 9 (1986).

Primary Examiner—Lenard A. Footland
Attorney, Agent, or Firm—Gravely, Lieder & Woodruff

[57] ABSTRACT

An aluminum transmission or transaxle case contains a steel shaft which is supported in the case on two directly mounted tapered roller bearings, so that the two bearings confine the shaft both radially and axially. To compensate for the differences in expansion and contraction between the aluminum case and the steel shaft as the transmission or transaxle experiences variations in temperature, a race of at least one of the bearings is fitted with a compensating ring having a coefficient of thermal expansion greater than that of the case or shaft. As a consequence, the bearings operate at a generally uniform setting over a wide range of temperature variations.

19 Claims, 4 Drawing Sheets

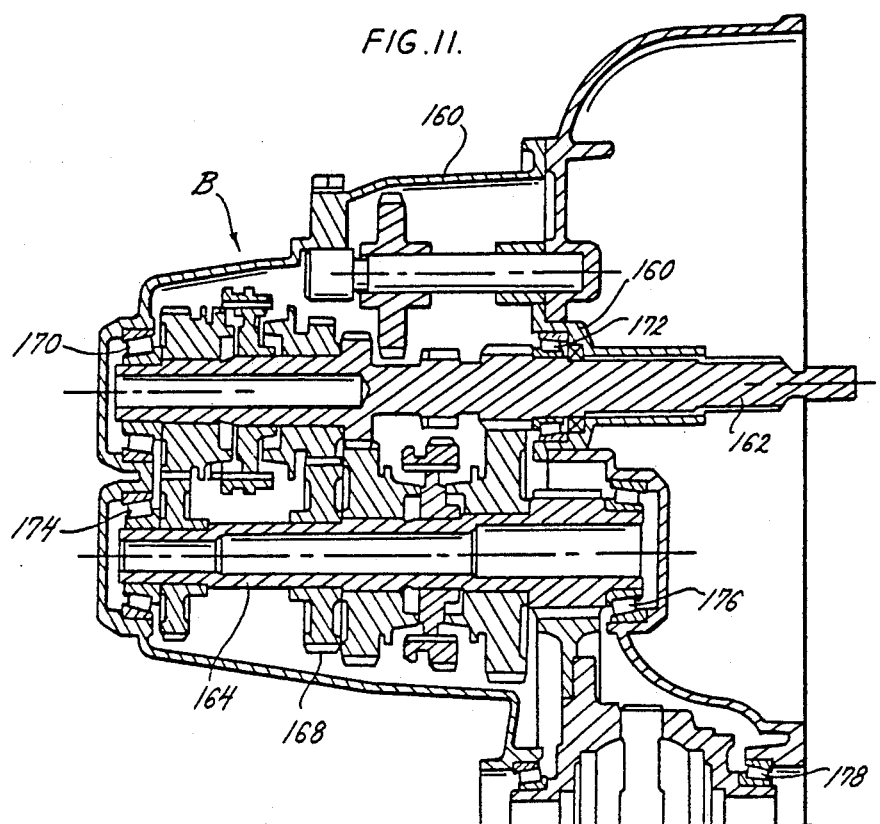
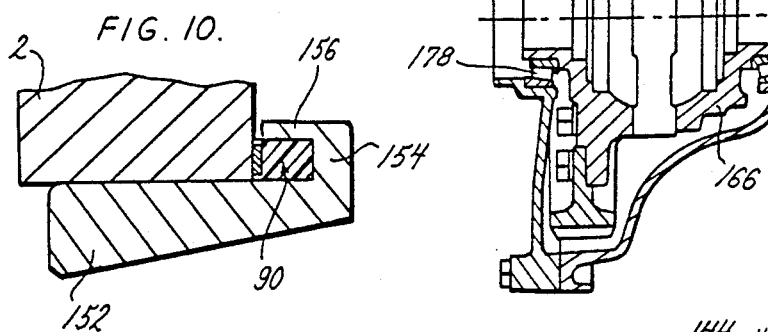
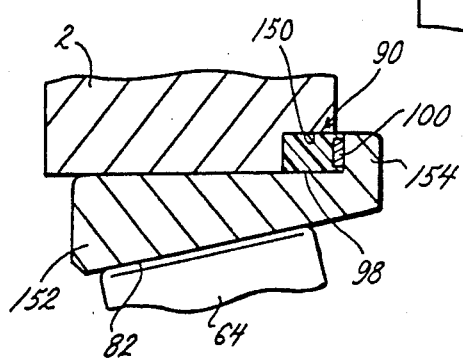
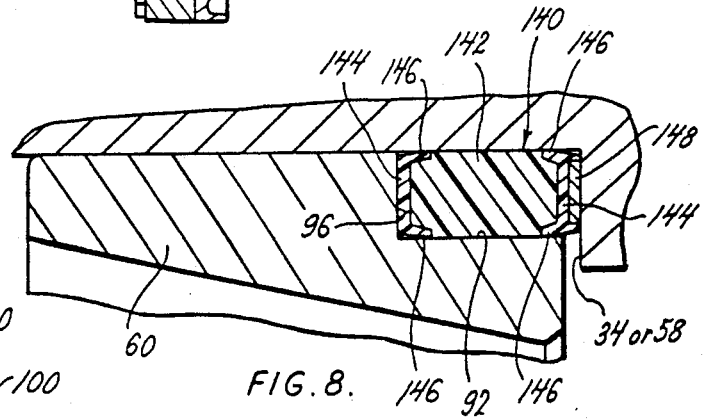

5,028,152

MACHINE WITH THERMALLY COMPENSATED BEARINGS

BACKGROUND OF THE INVENTION

This invention relates in general to transmissions and transaxles and like machinery and more particularly to machinery of that character having bearings which are mounted to compensate for differential thermal expansion and contraction between cases and shafts.

In an effort to reduce the weight of their vehicles, automobile manufactures have turned to lightweight aluminum alloys for the cases of transmissions and transaxles. Yet the shafts which turn in these cases and carry the gears that transmit the torque remain of steel, obviously because steel has great strength and resists wear. A variety of bearing arrangements exist for mounting shafts in transmission and transaxle cases, but the most compact and durable utilize tapered roller bearings. In a typical in-line transmission, the input and output shafts are axially aligned and are confined at opposite ends of the case in two single row tapered roller bearings which, with respect to each other, are directly mounted, that is the large ends of the rollers for each bearing are presented inwardly toward the interior of the case and toward each other. Moreover, the input shaft has a pocket which receives the end of the output shaft, and here the output shaft is provided with another single row tapered roller bearing, known as a pocket bearing, which is also mounted directly with respect to the bearing for the output shaft. The input and output shafts carry gears which mesh with gears on a countershaft, and the countershaft at its ends is fitted with single row tapered roller bearings that are set into the case also in the direct configuration. A typical manual shift transaxle has an input shaft and a parallel countershaft which are likewise set in directly mounted tapered roller bearings bearings will experience end play as the temperature rises above room temperature, since the case expands more than the shafts. While the expansion and contraction of the tapered roller bearings, due to the geometry of the bearings, tends to offset some of the effects of the differential expansion and contraction between the case and shafts, it is not nearly enough to maintain bearing settings generally constant over a wide range of temperature. Excessive preload increases the effort required to shift gears, particularly when changing from a high gear to a lower gear. This is most likely to occur during cold start up. Excessive end play, on the other hand, decreases the size of the zones through which loads are transmitted in the bearings, and this reduces the life of the bearings. It may also increase gear noise. Since end play allows some radial and axial displacement of the shafts, it may also change the positions in which the gears mesh.

The transmission and the transaxle of the present invention have all of their shafts mounted on tapered roller bearings, and those bearings at the ends of the shafts are set into the transmission or transaxle case. The bearings compensate for differential thermal expansion and contraction between the shafts and the case. As a result, the bearings remain at a more uniform setting over a wide range of operating temperatures.

DESCRIPTION OF THE DRAWINGS

In the accompanying drawings which form part of the specification and wherein like numerals and letters refer to like parts wherever they occur:

FIG. 8 is a sectional view of a cup provided with a modified compensating ring that is confined so as to utilize volumetric expansion;

FIG. 9 is a sectional view of a flanged cup and a compensating ring fitted to a rabbet in the surrounding case;

FIG. 10 is a sectional view of a flanged cup which radially confines a compensating ring; and FIG. 11 is a sectional view of a transaxle provided with thermally compensated bearings.

DETAILED DESCRIPTION

Figure 1:
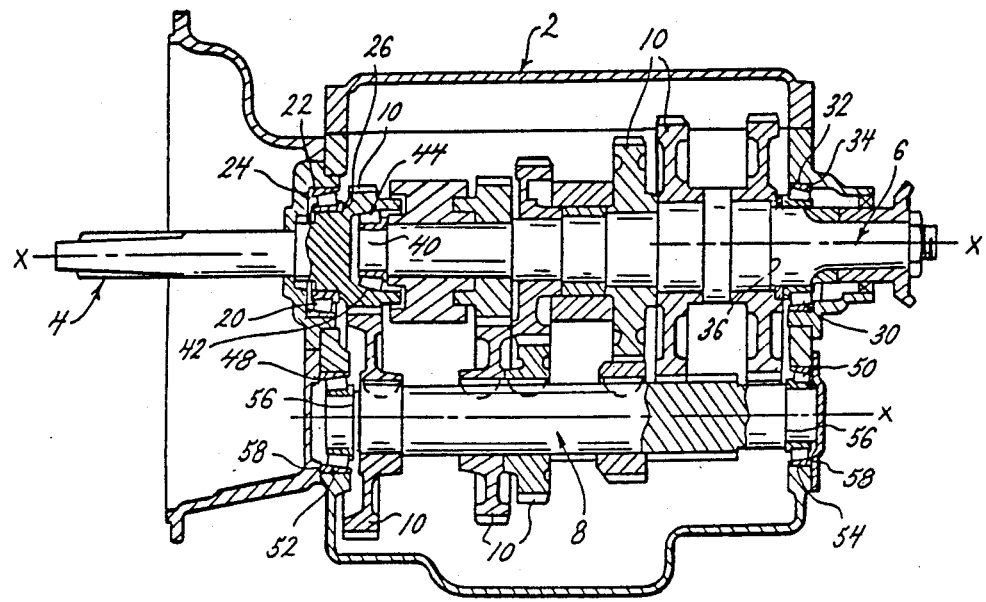
FIG. 1 is a sectional view of a transmission provided with thermally compensated bearings constructed in accordance with and embodying the present invention.

Referring now to the drawings, a manually operated automotive transmission A (FIG. 1) includes a case 2 which is cast from a lightweight metal such as aluminum alloy. The The pocket bearing 44 is much the same as the other bearings 20, 30, 48 and 50, except that it is not located in a wall of the case 2, but is instead located in the end of the input shaft 4. Moreover, its cup may be an integral part of the input shaft 4, in which event its raceway 82 forms the pocket 42.

The bearings 20, 30 and 44, being located along the common axis x of the input and output shafts 4 and 6, operate at a common setting, and that setting depends on the location of the cups 62 for the two bearings 20 and 30 that are in the case—or at least it is controlled by the location of those cups 62. For example, if the cups 62 are spread too far apart, the shafts 4 and 6 will be loose between those cups 62, or in other words, will be in a condition of end play. On the other hand, if the cups 62 are too close together, the bearings 20 and 30 and those portions of the shafts 4 and 6 that are between them, as well as the pocket bearing 44, will be in a state of compression or in other words in a condition of preload. Traditionally, the settings for the bearings of transmissions have been controlled with shims located between the back faces of the cups and the shoulders toward which those back faces are presented.

When subjected to temperature variations, the case 2, being formed from aluminum alloy, undergoes greater dimensional changes than the shafts 4 and 6, which are formed from steel. Indeed, aluminum alloy has about twice the coefficient of thermal expansion as does steel.

Figure 2:
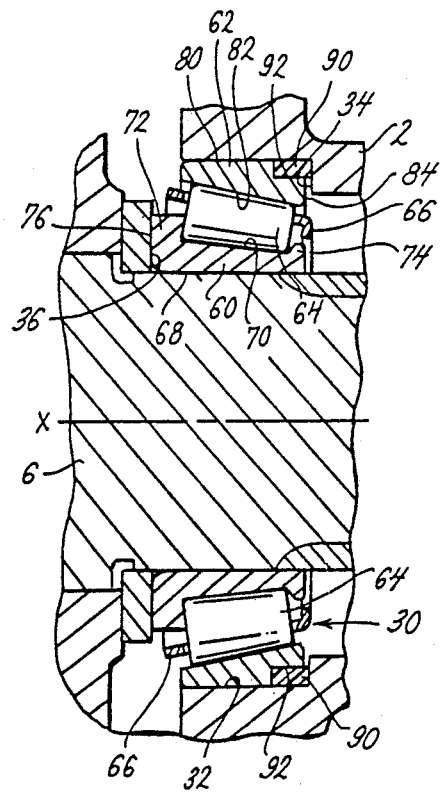
FIG. 2 is an enlarged sectional view of one of the thermally compensated bearings.

Thus, an elevation in temperature will cause the end walls of the case 2 to spread farther apart and they of course will carry the shoulders 24 and 34, which locate the cups 62 of the two bearings 20 and 30, outwardly with them. The shafts 4 and 6 will also grow and this spreads the backing shoulders 26 and 36 on the aligned shafts 4 and 6 farther apart. But the increase in distance between the shoulders 24 and 34 of the bores 22 and 32 is about twice as great as the increase in the distance between the backing shoulders 26 and 36 on the shafts 4 and 6. This differential expansion could significantly alter the setting of the bearings 20, 30 and 44 were it not for a compensating ring 90 in the cup 62 of the bearing 30 (FIG. 2).

More specifically, the cup 62 of the bearing 30 contains (FIG. 3) a recess or rabbet 92 which opens out of its cylindrical surface 80 and its back face 84, and while possessing some depth and length, it is not so extensive as to impair the structural integrity of the cup 62. This derives to a large measure from the fact that the rabbet 92 lies within the region of the cup 62 that is thickest, that is the region directly outwardly from the small diameter end of the tapered raceway 82. The rabbet 92 has a cylindrical surface 94 which is parallel to the cylindrical outer surface 80, but nevertheless is located inwardly from it, and an end face 96 which is squared off with respect to the axis x, but is of course offset from the cup back face 84.

Figure 3:
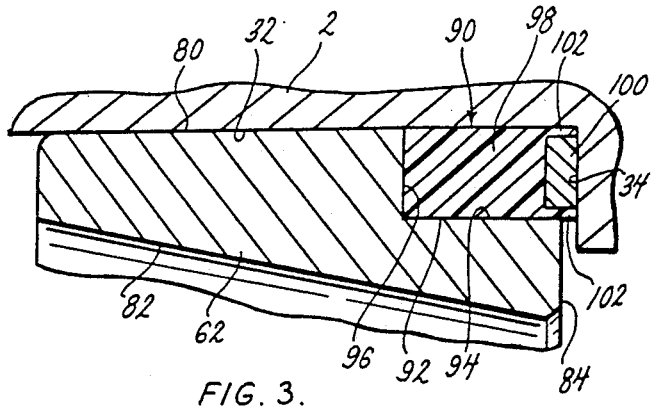
FIG. 3 is an enlarged sectional view of a cup for one of the thermally compensated bearings, with the cup carrying a compensating ring.

The compensating ring 90 is tightly fitted into the rabbet 92 (FIG. 3). As such, it bears against the end face 96 which serves as a backing surface for the ring 90. Indeed, the ring 90 projects a slight distance beyond the cup back face 84, but lies flush with or below the cylindrical outer surface 80. Hence, it also fits loosely in the bore 32 to facilitate assembly. For the most part the ring 90 is composed of an insert 98 or band formed from a material having a high coefficient of thermal expansion, indeed a coefficient that is significantly greater than the coefficient of expansion for the aluminum alloy of the case 2. Some polymers are suitable for this purpose including some polymers which are elastomers. One such elastomer is sold by E. I. duPont de Nemours under the trademark VITON. This elastomer has a coefficient of thermal expansion of about $120 \times 10^{-6}$ in/in/° F.

In addition to the insert 98, the compensating ring 90 includes an annular backing plate 100 of metal or other material which is bonded to the insert 98 at one end of the insert 98—that is at the end which is presented outwardly at the back face 84. Indeed, the plate 100 projects beyond or stands out from the back face 84 and from a functional standpoint forms the back face of the cup 62. Thus, the backing plate 100 bears against the shoulder 34 at the end of the bore 32 which contains the cup 62. This standout exists at the lowest operating temperatures for the bearing 30. The plate 100 is not as thick as the insert 98, and indeed the insert 98 has two thin webs 102 which extend axially along the inner and outer edges of the annular plate 100. The insert 98 is bonded to the plate 100 along that face of the insert 98 that is presented toward the plate 100 and also at the webs 102 which extend along the two edges of the plate 100. This prevents the insert 98 from extruding beyond the plate 100 when compressed. The compensating ring 90 may have another backing plate 100 at the opposite end of its insert 98, should extrusion tend to occur at that end.

The compensating ring 90 in the cup 62 of the bearing 30 maintains all three of the bearings 20, 30 and 44 that are along the two shafts 4 and 6 at a generally uniform setting over a wide range of temperature variations. Should the transmission A experience an increase in temperature, its case 2 will expand more than the two shafts 4 and 6, but even so the compensating ring 90 will maintain the spread between the two bearings 20 and 30 consistent with that of the expansion of the two axially aligned shafts 4 and 6. To this end, as the case 2 expands, thus moving apart the shoulders 24 and 34 which confine the cups 62 of the two bearings 20 and 30, the ring 90 likewise expands axially and forces the cup 62 for the bearing 30 farther from the shoulder 34 of its bore 32. The distance that cup 62 for the bearing 30 is displaced corresponds roughly to the difference in expansion between the case 2 and the two shafts 4 and 6 measured in the region between the two bearings 20 and 30, less any axial offset caused by axial expansion in the bearings 20, 30 and 44. Of course, when the transmission A experiences a decrease in its operating temperature, the opposite occurs. The compensating ring 90 will axially contract about the same as the difference between the contraction of the case 2 and two shafts 4 and 6, less the axial offset caused by contraction of the bearings 20, 30 and 44, so that the setting for the three bearings 20, 30 and 44 remains essentially the same. Thus, the compensating ring 90 compensates for differential thermal expansions and contractions between the case 2 and the axially aligned shafts 4 and 6 that are within the case 2.

The two bearings 48 and 50 which support the countershaft 8 also operate at a generally uniform setting over a wide range of temperature, since the cup 62 of the bearing 50 is likewise fitted with a compensating ring 90 that bears against the shoulder 58 at the end of the bore 54 in which that bearing is located. The compensation for the countershaft 8 can occur at the same end of the case 2 as the compensation for the aligned shafts 4 and 6, so the countershaft 8 is not displaced axially with respect to the aligned shafts 4 and 6. This ensures that the gears 10 of the three shafts 4, 6 and 8 mesh properly notwithstanding the compensation. However, the compensation for the countershaft 8 may be at the other end of the case 2.

As a result of the thermal compensation provided by the compensating rings 90 of the two bearings 30 and 50, the bearings 20, 30 and 44 along the aligned shafts 4 and 6 and the bearing 48 and 50 for the countershaft 8 do not experience excessive preload at cold temperatures, and this tends to reduce the shifting effort during cold start-up. More importantly, the rings 90 eliminate excessive end play in the bearings 20, 30, 44, 48 and 50 at higher operating temperatures, and this causes a better distribution of loads within those bearings, extends their lives, and improves machine reliability. Also, the rings 90 expand radially, although slightly, and this tends to prevent the cups 62 in which they are located from rotating in the bores 32 and 54 for the cups 62. The compensating rings 90 may also serve to dampen vibrations in the shafts 6 and 8, and this together with the reduction in end play may reduce the noise generated by the transmission A. Being supplied integral with the cups 62 for their respective bearings 30 and 50, the compensating rings 90 do not require any special handling by those who assemble the transmission A.

Where the transmission A is quite long, the cups 62 for the bearings 20 and 48 at the opposite end of the transmission may also be fitted with compensating rings 90 so as to provide the additional measure of compensation necessary to accommodate the greater length. However, the additional compensating rings 90 are generally not necessary in automobile transmissions where the distance between the bearings 20 and 30 for the shafts 4 and 6 and the distance between the bearings 48 and 50 for the countershaft 8 are not too large.

The length of the insert 98 for the compensating ring 90 used in the bearing 30 on the shaft 6 or in the bearing 50 of the shaft 8 depends on a number of factors including the distance ($d_c$) between the case shoulders 24 and 34, the distance ($d_s$) between shaft shoulder 26 and backing face 36, the coefficient ($C_{Al}$) of the thermal expansion for the aluminum alloy of the case 2, the coefficient ($C_{St}$) of thermal expansion for the steel of the shafts 4, 6, and 8, the coefficient ($C_p$) of thermal expansion for the insert 98 of the compensating ring 90, the temperature differential (AT), and the geometry of the bearings. One first calculates the maximum setting change (MSC) that results from the maximum change in temperature from ambient. This calculation not only considers the differences between the expansion of the case 2 and the shafts 4, 6 and 8, but also the offsetting difference in the stands of the bearings 20, 30 and 44, which occur primarily as a result of radial and axial expansions within the bearings 20, 30 and 44 themselves. In this regard, the geometry of a single row tapered roller bearing is such that the radial and axial expansion resulting from an increase in temperature will enlarge the stand of the bearing, that is to say the bearing will experience an increase ( b) in the distance between the back face 76 of its cone 60 and the back face 84 of its cup 62. Formulas familiar to bearing engineers exist for calculating the increase ( b) in the stand of a tapered roller bearing.

The maximum setting change (MSC) is calculated using the following formula:

$$MSC = [d_c(C_{Al}) - d_s(C_{St})](\Delta T) - \epsilon \Delta b$$

where ($\epsilon \Delta b$) is the sum of the changes in the stands for the bearings 20, 30, and 44 in the case of the shafts 4 and 6 or the sum in the changes in the stands for the bearings 48 and 50 in the case of the shaft 8.

The length (l) of the insert is derived from the following formula:

$$l = \frac{MSC}{(C_p)(\Delta T)}$$

Assume the bearings 48 and 50 on the steel countershaft 8 have the cup back faces 84 set 13 inches apart; that the distance between cone back faces 76 is 10 inches; that the ambient temperature is 70° F. and the normal operating temperature is 220° F., and that the coefficient ($C_p$) of expansion for the insert 98 is $120 \times 10^{-6}$ in/in/° F. Aluminum has a coefficient ($C_{Al}$) of expansion of $13 \times 10^{-6}$ in/in ° F., while the coefficient ($C_{St}$) for steel is $6.5 \times 10^{-6}$ in/in/° F. Also assume the sum of the changes ($\epsilon \Delta b$) in the stands of the two bearings 48 and 50 amounts to 0.005 inches. The maximum setting change (MSC) as the temperature of the transmission A rises from 70° F. to 220° F. amounts to:

$$MSC = [13(13 \times 10^{-6}) - 10(6.5 \times 10^{-6})](220 - 70) - 0.005 = 0.011 \text{ in.}$$

The insert 98 must have a length (l) of:

$$l = \frac{0.011}{(120 \times 10^{-6})150} = 0.611 \text{ in.}$$

Relying solely on linear expansion of the insert 98 often results in an insert 98 that requires a rabbet 92 larger than a single cup 62 can reasonably accommodate. However, if the insert 98 is confined radially as well as axially, and indeed retained in a state of axial compression when the transmission A is at ambient temperature, the volumetric expansion of the material in the insert 98 is in effect converted into a linear expansion. In other words, the insert 98, being confined both radially and circumferentially, experiences only axial expansion from an increase in temperature, and what may have otherwise occurred as radial and circumferential expansion, manifests itself as linear expansion. In short, the radial confinement produces a volumetric condition in which the coefficient of linear expansion is increased by a factor of 3.

Thus, when the length (l) of the insert 98 for the foregoing example is calculated on a volumetric basis, it becomes:

$$l = \frac{0.011}{(120 \times 10^{-6})150} \cdot \frac{1}{3} = \frac{0.611}{3} = 0.204 \text{ in.}$$

In order to utilize the volumetric principle of compensation, the material of the insert should be somewhat flexible, and for this reason elastomers, such as the elastomer sold under the trademark VITON, are generally better suited than more rigid polymers. However, elastomers tend to extrude more readily than the more rigid polymers, so the compensating ring 90 and the rabbet 92 and bore 32 or 54 into which it fits should be configured to inhibit extrusion of the insert 98.

A modified compensating ring 110 (FIG. 4) likewise fits into a rabbet 92 that opens out of the cup 62 of one of the bearings 30 or 50. The ring 110 includes an insert 112 which is formed from a soft elastomer, such as VITON elastomer. The ring 110 also includes two bands 114 and 116, each of U-shaped cross-section which telescope with respect to each other and encapsulate the insert 112. The bands 114 and 116 are preferably molded from a relatively rigid polymer, although they may be formed from metal as well. The bight portion of the smaller band 116 bears against the end face 96 of the rabbet 92, whereas the bight portion of the larger band 114 is presented beyond the back face 84 of the cup 62. The insert 112 possesses a high coefficient of thermal expansion, considerably greater than that of the case 2, and is bonded to neither of the bands 114 nor 116 along its cylindrical surfaces. The two bands 114 and 116 are fitted together loosely enough to enable one to slide relative to the other, and indeed expands and contracts in response to temperature variations.

Still another modified compensating ring 120 (FIG. 5), also fits in the rabbet 92 of the cup 62 for the bearing 30 or 50, but the cup 62 along the end face 96 of its rabbet 92 is further provided with a shallow annular groove 122 that opens out of the cylindrical surface 94 for the rabbet 92. The ring 120 includes an insert 124 which is formed from a polymer or elastomer having a high coefficient of thermal expansion. The insert 120 for all intents and purposes fills the rabbet 92 and indeed along its inner surface is provided with a nib 126 which projects into the groove 122 to retain the ring 124 in the rabbet 92. In addition to the insert 124, the compensating ring 120 includes a backing element 128 of U-shaped configuration. One end of the insert 124 fits into the element 128 where it is bonded to the element 128. The bight portion of the element 128 lies beyond the back face 84 of the cup 62. The element 128 may be molded from a relatively rigid polymer or stamped from a metal such as steel.

Still another modified compensating ring 130 (FIGS. 6 & 7) fits into an annular recess or groove 132 that is set inwardly from the outwardly presented surface 80 of the cup 62, so that it opens out of the back face 84 between the tapered raceway 82 and the outwardly presented surface 80. The ring 130 has an insert 134 and an annular backing plate 136 which are similar to their counterparts in the ring 90. The plate 136 is presented, at least in part, beyond the back face 84 of the cup 62. In addition, the insert 134 has a series of axially directed grooves 138 that enable air to escape, as the compensating ring 130 is fitted into the annular groove 132 of the cup 62.

Yet another modified compensating ring 140 (FIG. 8), which fits into the rabbet 92 of the cup 62 for one of the bearings 30 or 50 is designed to utilize the volumetric principle of compensation. It includes an insert 142 formed from a flexible material, such as VITON elastomer, and two backing plates 144, one at each end of insert 142. Being confined radially to achieve a volumetric condition, the insert 142 fits snugly over the cylindrical surface 94 of the rabbet 92 and likewise snugly against the surface of the bore 32 or 54 into which the cup 62 containing the rabbet 92 is located. Both of these surfaces are machined to effect a good seal with the two backing plates 144. In this regard, each backing plate 144 has a rearwardly directed flange 146 which forms a groove into which the end of the insert 142 fits, and indeed the insert 142 is bonded to the backing plates 144 between the two flanges 146 of each. The flanges 146 in turn have sealing lips which lie flush with the two cylindrical surfaces of the insert 142. The lips on the inner flanges 146 bear against the cylindrical surface 94 of the rabbet 92, whereas the lips of the outer flanges 146 bear against the cylindrical surface of the housing bore 32 or 54 which surrounds the rabbet 92 and compensating ring 140. The flanges 146 and their sealing lips prevent the flexible material of the insert 142 from extruding beyond the backing plates 144 in the presence of heavy axial forces. The backing plates 144 may be molded from a relatively firm polymer, and the one presented toward the shoulder 34 or 58 of the case may have a steel reinforcing element 148 embedded in it.

While the rabbet 92 in the cup 62 of either bearing 30 or 50 enables those bearings 30 or 50 to accommodate the compensating ring 90, or for that matter any of the other rings 110, 120, 130 or 140, in a highly compact manner, an alternate location is available in the surrounding case 2. In this regard, the housing bore 32 or 54 is enlarged in the region of the large ends of the tapered roller 64 to provide a counterbore 150 (FIG. 9). The bearing 30 or 50 which fits into the bore 32 or 54 has a cup 152 which at the large end of its raceway 82 projects through the counterbore 150 and beyond it where it is provided with an outwardly directed flange 154. The compensating ring 90 fits between the shoulder at the end of the counterbore 150 and the flange 154 of the cup 152 where it encircles the outwardly presented cylindrical surface 80 of the cup 152. The flange 154 may be provided with an integral lip 156 or an attached ring to radially and circumferentially confine the compensating ring 90 to prevent extrusion and thus rely on the volumetric principle of expansion (FIG. 10).

The compensation provided by the compensating ring 90, or for that matter any of the other rings 110, 120, 130 or 140, may be utilized in a transaxle B (FIG. 11) which in many respects resembles the in-line transmission A.

The transaxle B includes a case 160, which is cast from an aluminum alloy, and in addition an input shaft 162, a main shaft 164, and a differential shaft 166, all of which rotate in the case 160 and are formed from steel. The input shaft 162 and the main shaft 164 lie parallel to each other and carry gears 168 which mesh in various combinations to change the speed ratio between the shafts 162 and 164. The main shaft 164 couples with the differential shaft 166 through more gearing. The input shaft 162 rotates on two single row tapered roller bearings 170 and 172 which are set into opposite ends of the case 160 in the direct configuration. The main shaft 164 likewise rotates in two single row tapered roller bearings 174 and 176 set into the case 160 in the direct configuration. The same holds true for the gearing of the differential shaft 166; it rotates in a pair of directly mounted tapered roller bearings 178 fitted into the case 160, but the spread between the two bearings 178 is not as great as the spread between the bearing 170 and 172 of the input shaft 162 or the bearings 174 and 176 of the main shaft 164.

Either one or both of the bearings 170 and 172 for the input shaft 162 may be fitted with the compensating ring 90, or any of the other rings 110, 120, 130, or 140, and the same holds true with regard to bearings 174 and 176 of the countershaft 164. Similarly, either one of the bearings 178 of the differential shaft 166 may have a compensating ring 90, but the lesser spread between those bearings 178 reduces differential shaft expansion and contraction, and for most transaxles B, the ring 90 is not required at the differential shaft bearings 178.

Figure 12:
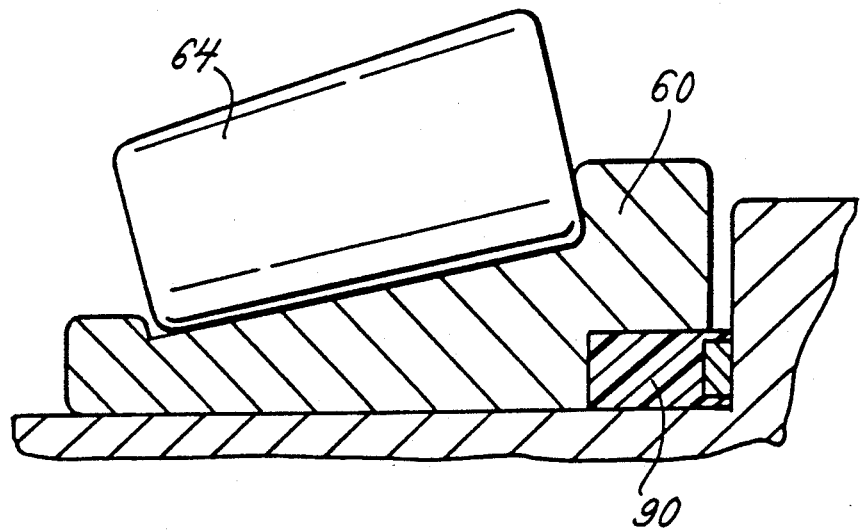
FIG. 12 is a sectional view of a cup with compensating ring mounted in a cone.

While the compensating rings 90, 110, 120, 130, and 140 are shown mounted on a cup, they may also be mounted in a cone (FIG. 12). This invention can also apply to automatic transmissions and transaxles as well.

This invention is intended to cover all changes and modifications of the example of the invention herein chosen for purposes of the disclosure which do not constitute departures from the spirit and scope of the invention.

What is claimed is:

1. In combination with a case having abutments, a shaft in the case and also having abutments presented toward and spaced axially from the abutments of the case, the shaft being formed from a material which has a different coefficient of thermal expansion than the material of the case, and at least two bearings supporting the shaft in the case, with the bearings being configured to accommodate both axial and radial loads and being mounted in the case and on the shaft between the abutments of the case and the shaft where they are in opposition to each other, so that the bearings confine the shaft both axially and radially in the case, the bearings having inner and outer races each of which is presented opposite to one of the abutments and is provided with a raceway that faces the raceway of the other race for the bearing, and rolling elements which roll along the raceways, the improvement comprising: one of the races of at least one of the bearings having a recess which opens toward the abutment opposite which that race is presented and compensating means located in the recess and against the abutment to which the recess opens for responding to temperature changes in the bearing to thereby compensate for differential thermal expansion and contraction between the shaft and the case so that the bearings maintain a more uniform setting over a wide range of temperature variations.

2. The combination according to claim 1 wherein the compensating means has a coefficient of thermal expansion substantially greater than both the case and the shaft.

3. The combination according to claim 2 wherein the compensating means is formed at least in part from a polymer.

4. The combination according to claim 2 wherein the compensating means is formed at least in part from an elastomer.

5. The combination according to claim 2 wherein the compensating means is a ring that fits into the recess for the race on which it is located.

6. The combination according to claim 2 wherein the compensating means includes a flexible material that is rigidly and snugly confined radially in the recess so that it does not expand radially inwardly or outwardly, whereby volumeric expansion and contraction manifests itself only in the axial direction and is greater than that attributable to the coefficient of thermal expansion.

7. The combination according to claim 2 wherein the bearing is a tapered roller bearing having a cone provided with an outwardly presented raceway, a cup provided with an inwardly presented raceway, and tapered rollers located between the raceways of the cup and cone; wherein the cone contains the recess and the compensating means fits into the recess in the cone; and wherein the shaft is provided with one of the abutments and the compensating means bears against that abutment.

8. In combination with a case having a shoulder, a shaft in the case and being formed from a material which has a different coefficient of thermal expansion than the material of the case, and at least two bearings supporting the shaft in the case, with the bearings being configured to accommodate both axial and radial loads and being mounted in the case and on the shaft in opposition to each other so that the bearings confine the shaft both axially and radially in the case, the bearings having races provided with raceways and rolling elements which roll along the raceways, at least one of the bearings being a tapered roller bearing having one of its races in the form of a cone provided with an outwardly presented raceway, the other of its races in the form of a cup provided with an inwardly presented raceway and located adjacent to the shoulder of the case, and its rolling elements in the form of tapered rollers located between the raceways of the cup and cone, the improvement comprising: compensating means fitted into the cup of the tapered roller bearing and being against the shoulder of the case for responding to temperature changes in the bearing to thereby compensate for differential thermal expansion and contraction between the shaft and the case, so that the bearings maintain a more uniform setting over a wide range of temperature variations.

9. The combination according to claim 8 wherein the cup has a cylindrical outer surface and a back face at the small end of the tapered raceway and also a recess which opens out of the back face; and wherein the compensating means is a ring which fits into the recess.

10. The combination according to claim 9 wherein the recess is a rabbet which opens out of the cylindrical outer surface and the back face of the cup.

11. A machine comprising: a case formed from a metal and containing abutments; a shaft mounted in the case and being formed from a metal having a coefficient of thermal expansion that is less than the coefficient of thermal expansion for the metal of the case, the shaft having abutments that are presented toward the abutments of the case; a pair of single row tapered roller bearings located in the case and around the shaft and being between the abutments of case and shaft, the bearings further being in opposition to each other so that they transmit radial and axial loads between the shaft and the case, each tapered roller bearing including a cone which is located around the shaft and has an outwardly presented raceway and a back face hat is presented toward one of the abutments on the shaft, a cup having an inwardly presented raceway and a back face that is presented toward one of the abutments in the case, and tapered rollers arranged in a single row between the raceways of the cone and cup, at least one of the cups containing a rabbet; a compensating ring fitted into rabbet of the cup and projecting beyond the back face of the cup where it bears against the case abutment toward which the cup back face is presented, the compensating ring being formed from a material that has a coefficient of thermal expansion greater than the coefficients of thermal expansion for the materials from which the case and shaft are formed and being oriented such that it compensates for thermal differential expansion and contraction between the case and shaft, so that the bearings remain at a more uniform setting over wide temperature variations.

12. A machine according to claim 11 wherein the ring includes a relatively hard backing element which is presented toward and bears against the abutment of the case.

13. A tapered roller bearing comprising: a first race in the form of a cone having an outwardly presented tapered raceway and a back face located beyond the large end of the raceway; a second race in the form of a cup that is located around the cone and has an inwardly presented raceway and a back face at the small end of the raceway; one of the races further having a backing surface that is presented in the same direction as its back face; tapered rollers located in a single row between the raceways of the cup and cone; and a compensating ring carried by cup and being against the backing surface of that race, the ring being formed from a material having a high coefficient of thermal expansion.

14. A tapered roller bearing according to claim 13 wherein the compensating ring is formed primarily from an elastomer having a high coefficient of thermal expansion.

15. A tapered roller bearing according to claim 13 wherein the cup has a radially outwardly directed flange and the backing surface is on the flanges.

16. A tapered roller bearing according to claim 13 wherein the compensating ring comprises an insert formed from a material having a high coefficient of thermal expansion and a harder backing element.

17. A tapered roller bearing according to claim 13 wherein the cup contains a recess which opens out of its back face, the backing surface being at one end of the recess; and wherein the ring is in the recess.

18. A tapered roller bearing according to claim 13 wherein the recess is a rabbet that opens out of the back face and outer surface of the cup.

19. A tapered roller bearing according to claim 13 wherein the recess is an annular groove that opens only out of the back face of the cup.

* * * * *

UNITED STATES PATENT AND TRADEMARK OFFICE
CERTIFICATE OF CORRECTION

PATENT NO. : 5,028,152

DATED : July 2, 1991

INVENTOR(S) : H. Hill, et al.

It is certified that error appears in the above-identified patent and that said Letters Patent is hereby corrected as shown below:

Columns 1 - 10 should be deleted to be replaced with columns 1-14, as shown on the attached pages.

Signed and Sealed this

Twenty-seventh Day of October, 1992

Attest:

DOUGLAS B. COMER

Attesting Officer

Acting Commissioner of Patents and Trademarks

MACHINE WITH THERMALLY COMPENSATED BEARINGS

BACKGROUND OF THE INVENTION

This invention relates in general to transmissions and transaxles and like machinery and more particularly to machinery of that character having bearings which are mounted to compensate for differential thermal expansion and contraction between cases and shafts.

In an effort to reduce the weight of their vehicles, automobile manufactures have turned to lightweight aluminum alloys for the cases of transmissions and transaxles. Yet the shafts which turn in these cases and carry the gears that transmit the torque remain of steel, obviously because steel has great strength and resists wear. A variety of bearing arrangements exist for mounting shafts in transmission and transaxle cases, but the most compact and durable utilize tapered roller bearings. In a typical in-line transmission, the input and output shafts are axially aligned and are confined at opposite ends of the case in two single row tapered roller bearings which, with respect to each other, are directly mounted, that is the large ends of the rollers for each bearing are presented inwardly toward the interior of the case and toward each other. Moreover, the input shaft has a pocket which receives the end of the output shaft, and here the output shaft is provided with another single row tapered roller bearing, known as a pocket bearing, which is also mounted directly with respect to the bearing for the output shaft. The input and output shafts carry gears which mesh with gears on a countershaft, and the countershaft at its ends is fitted with single row tapered roller bearings that are set into the case also in the direct configuration. A typical manual shift transaxle has an input shaft and a parallel countershaft which are likewise set in directly mounted tapered roller bearings that are fitted to the case, and the countershaft is in turn coupled through gearing with the differential shaft.

The tapered roller bearings carry extremely heavy loads for their size. Furthermore, they take axial or thrust loads as well as radial loads, and thus, a minimum number of bearings accommodate all of the loads to which the shafts are subjected. These characteristics serve to make transmissions equipped with tapered roller bearings highly compact.

Ideally, opposed tapered roller bearings should operate within an optimum setting range dictated by application requirements. Generally speaking, the objective is to minimize axial and radial free motion in the shafts, for this maximizes the bearing life, reduces noise, and improves gear mesh. The directly mounted bearings which support the aligned input and output shafts and the countershaft of the typical in-line transmission and the parallel input shaft, main shaft and differential shaft of the typical manual transaxle in effect capture those shafts axially. If the transmission or transaxle case were made from steel, like the shafts and bearings, the case and shafts and the bearings would expand similarly with temperature variations, and the settings of the bearings for each shaft would not change drastically over a wide range of temperatures. However, the aluminum alloys, from which many cases for the transmissions and transaxles of current manufacture are cast, have coefficients of thermal expansion greater than that of the steel from which the shafts and bearings are made. Assuming such a transmission or transaxle is assembled at room temperature with its directly mounted bearings in a condition of zero end play, the bearings will experience preload when the temperature drops, because the case contracts more than the shafts. By the same token, the bearings will experience end play as the temperature rises above room temperature, since the case expands more than the shafts. While the expansion and contraction of the tapered roller bearings, due to the geometry of the bearings, tends to offset some of the effects of the differential expansion and contraction between the case and shafts, it is not nearly enough to maintain bearing settings generally constant over a wide range of temperature. Excessive preload increases the effort required to shift gears, particularly when changing from a high gear to a lower gear. This is most likely to occur during cold start up. Excessive end play, on the other hand, decreases the size of the zones through which loads are transmitted in the bearings, and this reduces the life of the bearings. It may also increase gear noise. Since end play allows some radial and axial displacement of the shafts, it may also change the positions in which the gears mesh.

The transmission and the transaxle of the present invention have all of their shafts mounted on tapered roller bearings, and those bearings at the ends of the shafts are set into the transmission or transaxle case. The bearings compensate for differential thermal expansion and contraction between the shafts and the case. As a result, the bearings remain at a more uniform setting over a wide range of operating temperatures.

DESCRIPTION OF THE DRAWINGS

Figure 5:
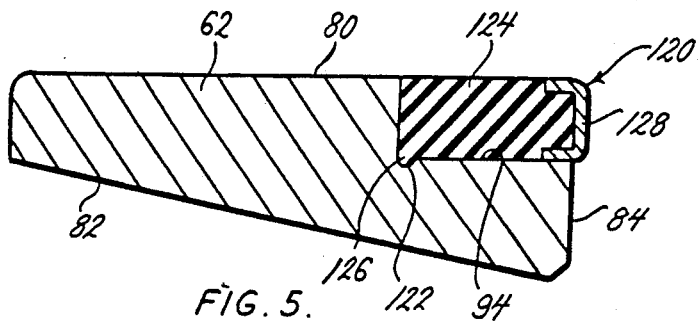
FIG. 5 is a sectional view of a cup provided with another modified compensating ring.
Figure 4:
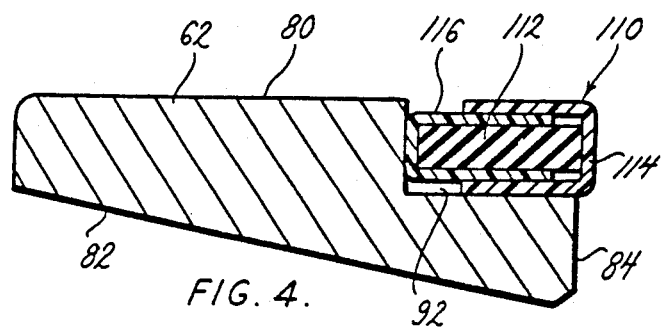
FIG. 4 is a sectional view of a cup provided with a modified compensating ring.
Figure 6:
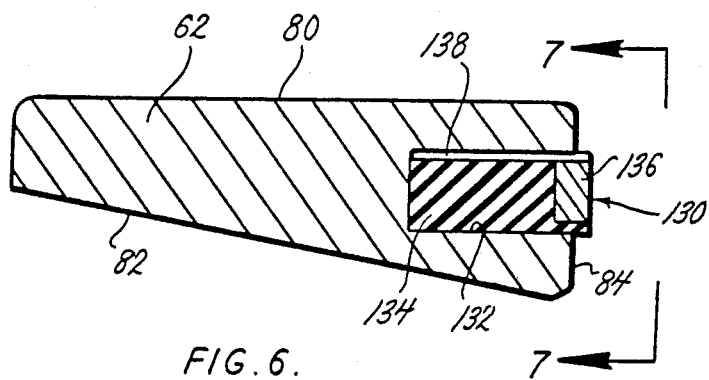
FIG. 6 is a sectional view of a cup provided with still another modified compensating ring located in an annular groove.
Figure 7:
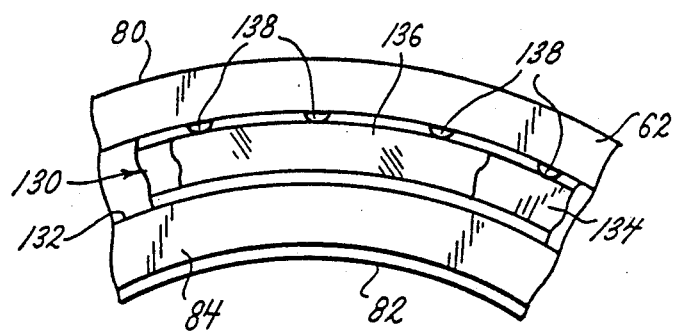
FIG. 7 is an end view taken along line 7—7 of FIG. 6 and showing the end of the cup.

In the accompanying drawings which form part of the specification and wherein like numerals and letters refer to like parts wherever they occur:

FIG. 1 is a sectional view of a transmission provided with thermally compensated bearings constructed in accordance with and embodying the present invention;

FIG. 2 is an enlarged sectional view of one of the thermally compensated bearings;

FIG. 3 is an enlarged sectional view of a cup for one of the thermally compensated bearings, with the cup carrying a compensating ring;

FIG. 4 is a sectional view of a cup provided with a modified compensating ring;

FIG. 5 is a sectional view of a cup provided with another modified compensating ring;

FIG. 6 is a sectional view of a cup provided with still another modified compensating ring located in an annular groove;

FIG. 7 is an end view taken along line 7—7 of FIG. 6 and showing the end of the cup;

FIG. 8 is a sectional view of a cup provided with a modified compensating ring that is confined so as to utilize volumetric expansion;

FIG. 9 is a sectional view of a flanged cup and a compensating ring fitted to a rabbet in the surrounding case;

FIG. 10 is a sectional view of a flanged cup which radially confines a compensating ring; and FIG. 11 is a sectional view of a transaxle provided with thermally compensated bearings.

FIG. 12 is a sectional view of a bearing cone with compensating ring mounted in it.

DETAILED DESCRIPTION

Referring now to the drawings, a manually operated automotive transmission A (FIG. 1) includes a case 2 which is cast from a lightweight metal such as aluminum alloy. The transmission A also has an input shaft 4 and an output shaft 6 which are axially aligned along an axis x of rotation, with the former projecting from one end of the case 2 and the latter from the other end. In addition, the transmission A has a countershaft 8 which is contained wholly within the case 2 where it rotates about another axis x that is parallel to the common axis x of the input and output shafts 4 and 6. All three of the shafts 4, 6 and 8 carry gears 10 which mesh in different combinations to produce different speed ratios between the input shaft 4 and the output shaft 6. The three shafts 4, 6 and 8 are machined from steel, as are the gears 10 on them.

The input shaft 4 rotates in a single row tapered roller bearing 20 (FIG. 1) that fits around it and within a bore 22 in the wall at one end of the case 2, it being located between abutments, that is a shoulder 24 at the end of the bore 22 are another shoulder 26 on the shaft 4. The output shaft 6 rotates on another single row tapered roller bearing 30 (FIGS. 1 & 2) located in a bore 32 at the opposite end wall of the case 2. It is also located between abutments in the form of a shoulder 34 at the end of the bore 32 and a backing face 36 on the shaft 6. Within the case 2 the output shaft 6 at its end has a pilot 40 (FIG. 1) which projects into a pocket 42 in the end of the input shaft 4. Here the pilot 40 is fitted with still another tapered roller bearing 44. The tapered roller bearings 20 and 30 are mounted in opposition in the direct configuration, that is, with the large ends of their tapered rollers presented inwardly toward each other. The tapered roller bearing 44 of the pocket 42 is mounted in the direct configuration with respect to the bearing 30 of the output shaft 6.

While the pocket bearing 44 enables the output shaft 6 to rotate relative to the input shaft 4, the two shafts 4 and 6 cannot move axially with respect to each other or with respect to the case 2, since the bearings 20 and 30 in effect capture them in the case 2. For purposes of the present invention, they are in effect one shaft.

The countershaft 8 is housed entirely within the case 2, its ends being received in single row tapered roller bearings 48 and 50 (FIG. 1) which are in turn received in bores 52 and 54, respectively, located in the end walls of the case 2. Indeed, the bore 52 lies below the bore 22 in which the bearing 20 for the input shaft 4 is located, whereas the bore 54 is located below the bore 32 in which the bearing 30 for the output shaft 6 is located. At its ends, the countershaft 8 has abutments, that is shoulders 56, and the bearings 48 and 50 are captured between these shoulders and corresponding abutments or shoulders 58 at the ends of the bores 52 and 54 of the case 2. The bearings 48 and 50 in turn capture the countershaft 8 in the case 2 in the sense that they prevent the countershaft 8 from moving radially or axially in the case 2, yet they permit rotation of the shaft 8 with minimal frictional resistance.

Each of the bearings 20, 30, 48, and 50, has an axis x of rotation which lies coincident with the axis x of the shaft 4, 6 or 8 which it supports, and being a single row tapered roller bearing, it includes (FIG. 2) a cone 60 which fits around one of the shafts 4, 6 or 8, a cup 62 which fits into one of the bores 22, 32, 52, or 54 and around the cone 60, tapered rollers 64 which are arranged in a single row between the cone 60 and cup 62, and a cage 66 for maintaining the proper spacing between the rollers 64. The cup 62 remains essentially stationary in the case 2, while the cone 60 rotates within it as its particular shaft 4, 6 or 8 turns about its axis x of rotation.

The cone 60 has a bore 68 (FIG. 2) which is slightly smaller than the shaft 4, 6 or 8 over which the cone 60 fits, so that an interference fit exists between the cone 60 and its shaft. It also has a tapered raceway 70 which is presented outwardly toward the cup 62. The raceway 70 lies between a thrust rib 72 and a retaining rib 74, both of which project outwardly beyond the raceway 70. The two ends of the cone 60 are squared off with respect to the axis x of rotation, the end at the thrust rib 72 forming a cone back face 76.

The cup 62 has an outwardly presented cylindrical surface 80 (FIG. 2) which may be slightly smaller or slightly larger than the bore 22, 32, 52, or 54 into which it fits, depending on whether an interference or loose fit is desired. In addition, the cup 62 has a tapered raceway 82 which is presented inwardly toward the tapered raceway 70 of the cone 60. The ends of the cup 62 are squared off with respect to the axis x, the larger of the end faces, which is at the small end of the tapered raceway 82, forming a cup back face 84.

The tapered rollers 64 lie in a single circumferential row between the raceways 70 and 82 of the cone 60 and cup 62 with their large end face presented toward the thrust rib 72 of the cone 60 (FIG. 2). Indeed, the thrust rib 72 prevents the rollers 64 from being expelled from the space between the two raceways 70 and 82 when a radial load is transmitted through the rollers 64. Moreover, the rollers 64 are on apex, meaning that if the side faces of the rollers 64 were extended to their respective apexes, those apexes would lie at a common point along the axis x, and the same holds true with regard to the two raceways 70 and 82.

The taper of the cone raceway 70 and the cup raceway 82 together with the taper of the rollers 64 which fit between them enables the bearings 20, 30, 48 and 50 to transmit radial loads and also axial loads, with the latter being resisted by shoulders 24, 34 and 58 at the ends of the bores 22, 32, 52 and 54 and by the shoulders 26, 36 and 56 on the shafts 4, 6 and 8.

In this regard, the cone 60 of the bearing 20 fits tightly around the input shaft 4 with its back face 76 against the shoulder 26 (FIG. 1). The cup 62 of that bearing fits snugly in the bore 22 with its back face 84 against the shoulder 24. While the cone 60 for the other bearing 30 fits snugly around the output shaft 6 with its backface 76 against the backing face 36, the cup 62 of that bearing fits loosely in the bore 32 with its back face 84 presented toward but not contacting the shoulder 34 at the end of the bore 32. Similarly, the cones 60 of the two bearings 48 and 50 for the countershaft 8 fit snugly around the countershaft 8 with their back faces against the shoulders 56 on the shaft 8. The cup 62 of the bearing 48 fits snugly within its bore 52 where its back face 84 is against the shoulder 58 at the end of the bore 52. On the other hand, the cup 62 of the bearing 50 fits loosely into the bore 54, and while its back face 84 is presented toward the shoulder 58 at the end of that bore, it does not actually contact the shoulder 58.

The cage 66 of each bearing 20, 30, 48 and 50 maintains a slight separation between adjacent rollers 64. It further holds the rollers 64 around the cone raceway 70 when the cone 60 is removed from the cup 62.

The pocket bearing 44 is much the same as the other bearings 20, 30, 48 and 50, except that it is not located in a wall of the case 2, but is instead located in the end of the input shaft 4. Moreover, its cup may be an integral part of the input shaft 4, in which event its raceway 82 forms the pocket 42.

The bearings 20, 30 and 44, being located along the common axis x of the input and output shafts 4 and 6, operate at a common setting, and that setting depends on the location of the cups 62 for the two bearings 20 and 30 that are in the case—or at least it is controlled by the location of those cups 62. For example, if the cups 62 are spread too far apart, the shafts 4 and 6 will be loose between those cups 62, or in other words, will be in a condition of end play. On the other hand, if the cups 62 are too close together, the bearings 20 and 30 and those portions of the shafts 4 and 6 that are between them, as well as the pocket bearing 44, will be in a state of compression or in other words in a condition of preload. Traditionally, the settings for the bearings of transmissions have been controlled with shims located between the back faces of the cups and the shoulders toward which those back faces are presented.

When subjected to temperature variations, the case 2, being formed from aluminum alloy, undergoes greater dimensional changes than the shafts 4 and 6, which are formed from steel. Indeed, aluminum alloy has about twice the coefficient of thermal expansion as does steel. Thus, an elevation in temperature will cause the end walls of the case 2 to spread farther apart and they of course will carry the shoulders 24 and 34, which locate the cups 62 of the two bearings 20 and 30, outwardly with them. The shafts 4 and 6 will also grow and this spreads the backing shoulders 26 and 36 on the aligned shafts 4 and 6 farther apart. But the increase in distance between the shoulders 24 and 34 of the bores 22 and 32 is about twice as great as the increase in the distance between the backing shoulders 26 and 36 on the shafts 4 and 6. This differential expansion could significantly alter the setting of the bearings 20, 30 and 44 were it not for a compensating ring 90 in the cup 62 of the bearing 30 (FIG. 2).

More specifically, the cup 62 of the bearing 30 contains (FIG. 3) a recess or rabbet 92 which opens out of its cylindrical surface 80 and its back face 84, and while possessing some depth and length, it is not so extensive as to impair the structural integrity of the cup 62. This derives to a large measure from the fact that the rabbet 92 lies within the region of the cup 62 that is thickest, that is the region directly outwardly from the small diameter end of the tapered raceway 82. The rabbet 92 has a cylindrical surface 94 which is parallel to the cylindrical outer surface 80, but nevertheless is located inwardly from it, and an end face 96 which is squared off with respect to the axis x, but is of course offset from the cup back face 84.

The compensating ring 90 is tightly fitted into the rabbet 92 (FIG. 3). As such, it bears against the end face 96 which serves as a backing surface for the ring 90. Indeed, the ring 90 projects a slight distance beyond the cup back face 84, but lies flush with or below the cylindrical outer surface 80. Hence, it also fits loosely in the bore 32 to facilitate assembly. For the most part the ring 90 is composed of an insert 98 or band formed from a material having a high coefficient of thermal expansion, indeed a coefficient that is significantly greater than the coefficient of expansion for the aluminum alloy of the case 2. Some polymers are suitable for this purpose including some polymers which are elastomers. One such elastomer is sold by E. I. duPont de Nemours under the trademark VITON. This elastomer has a coefficient of thermal expansion of about $120 \times 10^{-6}$ in/in/° F.

In addition to the insert 98, the compensating ring 90 includes an annular backing plate 100 of metal or other material which is bonded to the insert 98 at one end of the insert 98—that is at the end which is presented outwardly at the back face 84. Indeed, the plate 100 projects beyond or stands out from the back face 84 and from a functional standpoint forms the back face of the cup 62. Thus, the backing plate 100 bears against the shoulder 34 at the end of the bore 32 which contains the cup 62. This standout exists at the lowest operating temperatures for the bearing 30. The plate 100 is not as thick as the insert 98, and indeed the insert 98 has two thin webs 102 which extend axially along the inner and outer edges of the annular plate 100. The insert 98 is bonded to the plate 100 along that face of the insert 98 that is presented toward the plate 100 and also at the webs 102 which extend along the two edges of the plate 100. This prevents the insert 98 from extruding beyond the plate 100 when compressed. The compensating ring 90 may have another backing plate 100 at the opposite end of its insert 98, should extrusion tend to occur at that end.

The compensating ring 90 in the cup 62 of the bearing 30 maintains all three of the bearings 20, 30 and 44 that are along the two shafts 4 and 6 at a generally uniform setting over a wide range of temperature variations. Should the transmission A experience an increase in temperature, its case 2 will expand more than the two shafts 4 and 6, but even so the compensating ring 90 will maintain the spread between the two bearings 20 and 30 consistent with that of the expansion of the two axially aligned shafts 4 and 6. To this end, as the case 2 expands, thus moving apart the shoulders 24 and 34 which confine the cups 62 of the two bearings 20 and 30, the ring 90 likewise expands axially and forces the cup 62 for the bearing 30 farther from the shoulder 34 of its bore 32. The distance that cup 62 for the bearing 30 is displaced corresponds roughly to the difference in expansion between the case 2 and the two shafts 4 and 6 measured in the region between the two bearings 20 and 30, less any axial offset caused by axial expansion in the bearings 20, 30 and 44. Of course, when the transmission A experiences a decrease in its operating temperature, the opposite occurs. The compensating ring 90 will axially contract about the same as the difference between the contraction of the case 2 and two shafts 4 and 6, less the axial offset caused by contraction of the bearings 20, 30 and 44, so that the setting for the three bearings 20, 30 and 44 remains essentially the same. Thus, the compensating ring 90 compensates for differential thermal expansions and contractions between the case 2 and the axially aligned shafts 4 and 6 that are within the case 2.

The two bearings 48 and 50 which support the countershaft 8 also operate at a generally uniform setting over a wide range of temperature, since the cup 62 of the bearing 50 is likewise fitted with a compensating ring 90 that bears against the shoulder 58 at the end of the bore 54 in which that bearing is located. The compensation for the countershaft 8 can occur at the same end of the case 2 as the compensation for the aligned shafts 4 and 6, so the countershaft 8 is not displaced axially with respect to the aligned shafts 4 and 6. This ensures that the gears 10 of the three shafts 4, 6 and 8 mesh properly notwithstanding the compensation. However, the compensation for the countershaft 8 may be at the other end of the case 2.

As a result of the thermal compensation provided by the compensating rings 90 of the two bearings 30 and 50, the bearings 20, 30 and 44 along the aligned shafts 4 and 6 and the bearing 48 and 50 for the countershaft 8 do not experience excessive preload at cold temperatures, and this tends to reduce the shifting effort during cold start-up. More importantly, the rings 90 eliminate excessive end play in the bearings 20, 30, 44, 48 and 50 at higher operating temperatures, and this causes a better distribution of loads within those bearings, extends their lives, and improves machine reliability. Also, the rings 90 expand radially, although slightly, and this tends to prevent the cups 62 in which they are located from rotating in the bores 32 and 54 for the cups 62. The compensating rings 90 may also serve to dampen vibrations in the shafts 6 and 8, and this together with the reduction in end play may reduce the noise generated by the transmission A. Being supplied integral with the cups 62 for their respective bearings 30 and 50, the compensating rings 90 do not require any special handling by those who assemble the transmission A.

Where the transmission A is quite long, the cups 62 for the bearings 20 and 48 at the opposite end of the transmission may also be fitted with compensating rings 90 so as to provide the additional measure of compensation necessary to accommodate the greater length. However, the additional compensating rings 90 are generally not necessary in automobile transmissions where the distance between the bearings 20 and 30 for the shafts 4 and 6 and the distance between the bearings 48 and 50 for the countershaft 8 are not too large.

The length of the insert 98 for the compensating ring 90 used in the bearing 30 on the shaft 6 or in the bearing 50 of the shaft 8 depends on a number of factors including the distance ($d_c$) between the case shoulders 24 and 34, the distance ($d_s$) between shaft shoulder 26 and backing face 36, the coefficient ($C_{Al}$) of the thermal expansion for the aluminum alloy of the case 2, the coefficient ($C_{Si}$) of thermal expansion for the steel of the shafts 4, 6, and 8, the coefficient ($C_p$) of thermal expansion for the insert 98 of the compensating ring 90, the temperature differential (ΔT), and the geometry of the bearings. One first calculates the maximum setting change (MSC) that results from the maximum change in temperature from ambient. This calculation not only considers the differences between the expansion of the case 2 and the shafts 4, 6 and 8, but also the offsetting difference in the stands of the bearings 20, 30 and 44, which occur primarily as a result of radial and axial expansions within the bearings 20, 30 and 44 themselves. In this regard, the geometry of a single row tapered roller bearing is such that the radial and axial expansion resulting from an increase in temperature will enlarge the stand of the bearing, that is to say the bearing will experience an increase (b) in the distance between the back face 76 of its cone 60 and the back face 84 of its cup 62. Formulas familiar to bearing engineers exist for calculating the increase (b) in the stand of a tapered roller bearing.

The maximum setting change (MSC) is calculated using the following formula:

$$MSC = [d_c(C_{Al}) - d_s(C_{Si})](\Delta T) - \epsilon\Delta b$$

where (εΔb) is the sum of the changes in the stands for the bearings 20, 30, and 44 in the case of the shafts 4 and 6 or the sum in the changes in the stands for the bearings 48 and 50 in the case of the shaft 8.

The length (l) of the insert is derived from the following formula:

$$l = \frac{MSC}{(C_p)(\Delta T)}$$

Assume the bearings 48 and 50 on the steel countershaft 8 have the cup back faces 84 set 13 inches apart; that the distance between cone back faces 76 is 10 inches; that the ambient temperature is 70° F. and the normal operating temperature is 220° F., and that the coefficient ($C_p$) of expansion for the insert 98 is $120 \times 10^{-6}$ in/in/° F. Aluminum has a coefficient ($C_{Al}$) of expansion of $13 \times 10^{-6}$ in/in ° F., while the coefficient ($C_{Si}$) for steel is $6.5 \times 10^{-6}$ in/in/° F. Also assume the sum of the changes (εΔb) in the stands of the two bearings 48 and 50 amounts to 0.005 inches. The maximum setting change (MSC) as the temperature of the transmission A rises from 70° F. to 220° F. amounts to:

$$MSC = [13(13 \times 10^{-6}) - 10(6.5 \times 10^{-6})](220 - 70) - 0.005 = 0.011 \text{ in.}$$

The insert 98 must have a length (l) of:

$$l = \frac{0.011}{(120 \times 10^{-6})150} = 0.611 \text{ in.}$$

Relying solely on linear expansion of the insert 98 often results in an insert 98 that requires a rabbet 92 larger than a single cup 62 can reasonably accommodate. However, if the insert 98 is confined radially as well as axially, and indeed retained in a state of axial compression when the transmission A is at ambient temperature, the volumetric expansion of the material in the insert 98 is in effect converted into a linear expansion. In other words, the insert 98, being confined both radially and circumferentially, experiences only axial expansion from an increase in temperature, and what may have otherwise occurred as radial and circumferential expansion, manifests itself as linear expansion. In short, the radial confinement produces a volumetric condition in which the coefficient of linear expansion is increased by a factor of 3.

Thus, when the length (l) of the insert 98 for the foregoing example is calculated on a volumetric basis, it becomes:

$$l = \frac{0.011}{(120 \times 10^{-6})150} \cdot \frac{1}{3} = \frac{0.611}{3} = 0.204 \text{ in.}$$

In order to utilize the volumetric principle of compensation, the material of the insert should be somewhat flexible, and for this reason elastomers, such as the elastomer sold under the trademark VITON, are generally better suited than more rigid polymers. However, elastomers tend to extrude more readily than the more rigid polymers, so the compensating ring 90 and the rabbet 92 and bore 32 or 54 into which it fits should be configured to inhibit extrusion of the insert 98.

A modified compensating ring 110 (FIG. 4) likewise fits into a rabbet 92 that opens out of the cup 62 of one of the bearings 30 or 50. The ring 110 includes an insert 112 which is formed from a soft elastomer, such as VITON elastomer. The ring 110 also includes two bands 114 and 116, each of U-shaped cross-section which telescope with respect to each other and encapsulate the insert 112. The bands 114 and 116 are preferably molded from a relatively rigid polymer, although they may be formed from metal as well. The bight portion of the smaller band 116 bears against the end face 96 of the rabbet 92, whereas the bight portion of the larger band 114 is presented beyond the back face 84 of the cup 62. The insert 112 possesses a high coefficient of thermal expansion, considerably greater than that of the case 2, and is bonded to neither of the bands 114 nor 116 along its cylindrical surfaces. The two bands 114 and 116 are fitted together loosely enough to enable one to slide relative to the other, and indeed expands and contracts in response to temperature variations.

Still another modified compensating ring 120 (FIG. 5), also fits in the rabbet 92 of the cup 62 for the bearing 30 or 50, but the cup 62 along the end face 96 of its rabbet 92 is further provided with a shallow annular groove 122 that opens out of the cylindrical surface 94 for the rabbet 92. The ring 120 includes an insert 124 which is formed from a polymer or elastomer having a high coefficient of thermal expansion. The insert 120 for all intents and purposes fills the rabbet 92 and indeed along its inner surface is provided with a nib 126 which projects into the groove 122 to retain the ring 124 in the rabbet 92. In addition to the insert 124, the compensating ring 120 includes a backing element 128 of U-shaped configuration. One end of the insert 124 fits into the element 128 where it is bonded to the element 128. The bight portion of the element 128 lies beyond the back face 84 of the cup 62. The element 128 may be molded from a relatively rigid polymer or stamped from a metal such as steel.

Still another modified compensating ring 130 (FIGS. 6 & 7) fits into an annular recess or groove 132 that is set inwardly from the outwardly presented surface 80 of the cup 62, so that it opens out of the back face 84 between the tapered raceway 82 and the outwardly presented surface 80. The ring 130 has an insert 134 and an annular backing plate 136 which are similar to their counterparts in the ring 90. The plate 136 is presented, at least in part, beyond the back face 84 of the cup 62. In addition, the insert 134 has a series of axially directed grooves 138 that enable air to escape, as the compensating ring 130 is fitted into the annular groove 132 of the cup 62.

Yet another modified compensating ring 140 (FIG. 8), which fits into the rabbet 92 of the cup 62 for one of the bearings 30 or 50 is designed to utilize the volumetric principle of compensation. It includes an insert 142 formed from a flexible material, such as VITON elastomer, and two backing plates 144, one at each end of insert 142. Being confined radially to achieve a volumetric condition, the insert 142 fits snugly over the cylindrical surface 94 of the rabbet 92 and likewise snugly against the surface of the bore 32 or 54 into which the cup 62 containing the rabbet 92 is located. Both of these surfaces are machined to effect a good seal with the two backing plates 144. In this regard, each backing plate 144 has a rearwardly directed flange 146 which forms a groove into which the end of the insert 142 fits, and indeed the insert 142 is bonded to the backing plates 144 between the two flanges 146 of each. The flanges 146 in turn have sealing lips which lie flush with the two cylindrical surfaces of the insert 142. The lips on the inner flanges 146 bear against the cylindrical surface 94 of the rabbet 92, whereas the lips of the outer flanges 146 bear against the cylindrical surface of the housing bore 32 or 54 which surrounds the rabbet 92 and compensating ring 140. The flanges 146 and their sealing lips prevent the flexible material of the insert 142 from extruding beyond the backing plates 144 in the presence of heavy axial forces. The backing plates 144 may be molded from a relatively firm polymer, and the one presented toward the shoulder 34 or 58 of the case may have a steel reinforcing element 148 embedded in it.

While the rabbet 92 in the cup 62 of either bearing 30 or 50 enables those bearings 30 or 50 to accommodate the compensating ring 90, or for that matter any of the other rings 110, 120, 130 or 140, in a highly compact manner, an alternate location is available in the surrounding case 2. In this regard, the housing bore 32 or 54 is enlarged in the region of the large ends of the tapered roller 64 to provide a counterbore 150 (FIG. 9). The bearing 30 or 50 which fits into the bore 32 or 54 has a cup 152 which at the large end of its raceway 82 projects through the counterbore 150 and beyond it where it is provided with an outwardly directed flange 154. The compensating ring 90 fits between the shoulder at the end of the counterbore 150 and the flange 154 of the cup 152 where it encircles the outwardly presented cylindrical surface 80 of the cup 152. The flange 154 may be provided with an integral lip 156 or an attached ring to radially and circumferentially confine the compensating ring 90 to prevent extrusion and thus rely on the volumetric principle of expansion (FIG. 10).

The compensation provided by the compensating ring 90, or for that matter any of the other rings 110, 120, 130 or 140, may be utilized in a transaxle B (FIG. 11) which in many respects resembles the in-line transmission A.

The transaxle B includes a case 160, which is cast from an aluminum alloy, and in addition an input shaft 162, a main shaft 164, and a differential shaft 166, all of which rotate in the case 160 and are formed from steel. The input shaft 162 and the main shaft 164 lie parallel to each other and carry gears 168 which mesh in various combinations to change the speed ratio between the shafts 162 and 164. The main shaft 164 couples with the differential shaft 166 through more gearing. The input shaft 162 rotates on two single row tapered roller bearings 170 and 172 which are set into opposite ends of the case 160 in the direct configuration. The main shaft 164 likewise rotates in two single row tapered roller bearings 174 and 176 set into the case 160 in the direct configuration. The same holds true for the gearing of the differential shaft 166; it rotates in a pair of directly mounted tapered roller bearings 178 fitted into the case 160, but the spread between the two bearings 178 is not as great as the spread between the bearing 170 and 172 of the input shaft 162 or the bearings 174 and 176 of the main shaft 164.

Either one or both of the bearings 170 and 172 for the input shaft 162 may be fitted with the compensating ring 90, or any of the other rings 110, 120, 130, or 140, and the same holds true with regard to bearings 174 and 176 of the countershaft 164. Similarly, either one of the bearings 178 of the differential shaft 166 may have a compensating ring 90, but the lesser spread between those bearings 178 reduces differential shaft expansion and contraction, and for most transaxles B, the ring 90 is not required at the differential shaft bearings 178.

While the compensating rings 90, 110, 120, 130, and 140 are shown mounted on a cup, they may also be mounted in a cone (FIG. 12). This invention can also apply to automatic transmissions and transaxles as well.

What is claimed is:

1. In combination with a case having abutments, a shaft in the case and also having abutments presented toward and spaced axially from the abutments of the case, the shaft being formed from a material which has a different coefficient of thermal expansion than the material of the case, and at least two bearings supporting the shaft in the case, with the bearings being configured to accommodate both axial and radial loads and being mounted in the case and on the shaft between the abutments of the case and the shaft where they are in opposition to each other, so that the bearings confine the shaft both axially and radially in the case, the bearings having inner and outer races each of which is presented opposite to one of the abutments and is provided with a raceway that faces the raceway of the other race for the bearing, and rolling elements which roll along the raceways, the improvement comprising: one of the races of at least one of the bearings having a recess which opens toward the abutment opposite which that race is presented and compensating means located in the recess and against the abutment to which the recess opens for responding to temperature changes in the bearing to thereby compensate for differential thermal expansion and contraction between the shaft and the case so that the bearings maintain a more uniform setting over a wide range of temperature variations.

2. The combination according to claim 1 wherein the compensating means has a coefficient of thermal expansion substantially greater than both the case and the shaft.

3. The combination according to claim 2 wherein the compensating means is formed at least in part from a polymer.

4. The combination according to claim 2 wherein the compensating means is formed at least in part from an elastomer.

5. The combination according to claim 2 wherein the compensating means is a ring that fits into the recess for the race on which it is located.

6. The combination according to claim 2 wherein the compensating means includes a flexible material that is rigidly and snugly confined radially in the recess so that it does not expand radially inwardly or outwardly, whereby volumeric expansion and contraction manifests itself only in the axial direction and is greater than that attributable to the coefficient of thermal expansion.

7. The combination according to claim 2 wherein the bearing is a tapered roller bearing having a cone provided with an outwardly presented raceway, a cup provided with an inwardly presented raceway, and tapered rollers located between the raceways of the cup and cone; wherein the cone contains the recess and the compensating means fits into the recess in the cone; and wherein the shaft is provided with one of the abutments and the compensating means bears against that abutment.

8. In combination with a case having a shoulder, a shaft in the case and being formed from a material which has a different coefficient of thermal expansion than the material of the case, and at least two bearings supporting the shaft in the case, with the bearings being configured to accommodate both axial and radial loads and being mounted in the case and on the shaft in opposition to each other so that the bearings confine the shaft both axially and radially in the case, the bearings having races provided with raceways and rolling elements which roll along the raceways, at least one of the bearings being a tapered roller bearing having one of its races in the form of a cone provided with an outwardly presented raceway, the other of its races in the form of a cup provided with an inwardly presented raceway and located adjacent to the shoulder of the case, and its rolling elements in the form of tapered rollers located between the raceways of the cup and cone, the improvement comprising: compensating means fitted into the cup of the tapered roller bearing and being against the shoulder of the case for responding to temperature changes in the bearing to thereby compensate for differential thermal expansion and contraction between the shaft and the case, so that the bearings maintain a more uniform setting over a wide range of temperature variations.

9. The combination according to claim 8 wherein the cup has a cylindrical outer surface and a back face at the small end of the tapered raceway and also a recess which opens out of the back face; and wherein the compensating means is a ring which fits into the recess.

10. The combination according to claim 9 wherein the recess is a rabbet which opens out of the cylindrical outer surface and the back face of the cup.

11. A machine comprising: a case formed from a metal and containing abutments; a shaft mounted in the case and being formed from a metal having a coefficient of thermal expansion that is less than the coefficient of thermal expansion for the metal of the case, the shaft having abutments that are presented toward the abutments of the case; a pair of single row tapered roller bearings located in the case and around the shaft and being between the abutments of case and shaft, the bearings further being in opposition to each other so that they transmit radial and axial loads between the shaft and the case, each tapered roller bearing including a cone which is located around the shaft and has an outwardly presented raceway and a back face that is presented toward one of the abutments on the shaft, a cup having an inwardly presented raceway and a back face that is presented toward one of the abutments in the case, and tapered rollers arranged in a single row between the raceways of the cone and cup, at least one of the cups containing a rabbet; a compensating ring fitted into rabbet of the cup and projecting beyond the back face of the cup where it bears against the case abutment toward which the cup back face is presented, the compensating ring being formed from a material that has a coefficient of thermal expansion greater than the coefficients of thermal expansion for the materials from which the case and shaft are formed and being oriented such that it compensates for thermal differential expansion and contraction between the case and shaft, so that the bearings remain at a more uniform setting over wide temperature variations.

12. A machine according to claim 11 wherein the ring includes a relatively hard backing element which is presented toward and bears against the abutment of the case.

13. A tapered roller bearing comprising: a first race in the form of a cone having an outwardly presented tapered raceway and a back face located beyond the large end of the raceway; a second race in the form of a cup that is located around the cone and has an inwardly presented raceway and a back face at the small end of the raceway; one of the races further having a backing surface that is presented in the same direction as its back face; tapered rollers located in a single row between the raceways of the cup and cone; and a compensating ring carried by cup and being against the backing surface of that race, the ring being formed from a material having a high coefficient of thermal expansion.

14. A tapered roller bearing according to claim 13 wherein the compensating ring is formed primarily from an elastomer having a high coefficient of thermal expansion.

15. A tapered roller bearing according to claim 13 wherein the cup has a radially outwardly directed flange and the backing surface is on the flanges.

16. A tapered roller bearing according to claim 13 wherein the compensating ring comprises an insert formed from a material having a high coefficient of thermal expansion and a harder backing element.

17. A tapered roller bearing according to claim 13 wherein the cup contains a recess which opens out of its back face, the backing surface being at one end of the recess; and wherein the ring is in the recess.

18. A tapered roller bearing according to claim 13 wherein the recess is a rabbet that opens out of the back face and outer surface of the cup.

19. A tapered roller bearing according to claim 13 wherein the recess is an annular groove that opens only out of the back face of the cup.

* * * * *